Sept. 13, 1949. R. CARPENTER 2,481,568
STEAM JOINT
Filed June 7, 1947
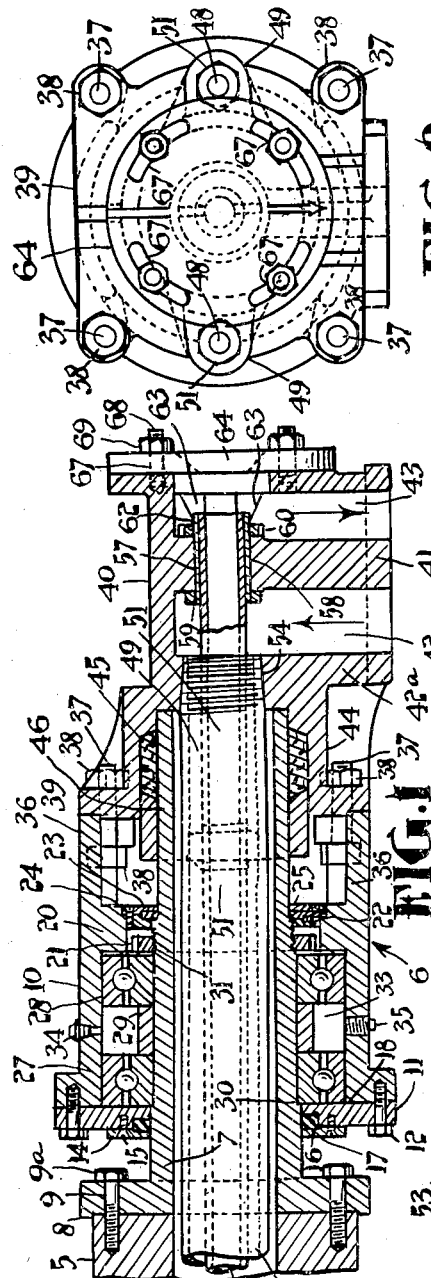
INVENTOR
RUSSELL CARPENTER
BY Fetherstonhaugh & Co.
ATTORNEYS Patented Sept. 13, 1949

2,481,568

UNITED STATES PATENT OFFICE 2,481,568

STEAM JOINT

Russell Carpenter, Three Rivers, Quebec, Canada

Application June 7, 1947, Serial No. 753,275

4 Claims. (Cl. 285—10)

This invention relates to improvements in steam joint attachments for rotary steam heated cylinders used in the paper making and other industries.

One object of the present invention is the provision of a steam joint attachment including interchangeable parts designed for selective assembly to provide either a syphon-type or a bucket-type steam joint attachment.

Another object is to provide a convertible steam joint attachment of the character described which is simple in design; is composed of relatively few parts; and can be manufactured and sold at a cost comparing favorably with the cost of the syphon-type and bucket-type steam joint attachments now available.

A further object is the provision of a syphon-type steam joint attachment in which the steam delivery pipe and the syphon pipe are supported in a novel manner so that no supports for these elements are required within the cylinder itself.

A still further object is the provision of a syphon-type steam joint attachment designed so that all the component parts except the syphon pipe can be readily detached from the steam heated cylinder without removing the syphon pipe.

Other objects, advantages and characteristic features of the invention will be more readily understood from the following detailed description taken in connection with the accompanying drawings, in which—

Fig. 1 is a longitudinal sectional view of my improved joint attachment as it appears when the component parts are assembled to provide a syphon-type attachment.

Fig. 2 is a right hand end view of the attachment shown in Fig. 1.

Figs. 3 and 4 are detail views illustrating the manner in which the syphon pipe shown in the preceding figures is supported by and clamped against the delivery end of the steam delivery pipe.

Figs. 5 and 6 are views similar to Figs. 3 and 4 but showing a slight modification.

Fig. 7 is a fragmentary sectional view of the joint assembly as it appears when the syphon-type casting shown in Fig. 1 is replaced by a bucket-type casting; and Fig. 8 is a right hand end view of the assembly shown in Fig. 7.

In Fig. 1 the steam heated cylinder to which my improved syphon-type steam joint assembly It comprises a tubular member 7 open at both ends and provided with an end flange 8 which is fastened by bolts 9 and nuts 9a to the end of journal 5 so that member 7 rotates with said journal. Member 7 extends through a stationary bearing housing 10 provided, at the end nearest journal 5, with a removable end wall 11 secured in place by bolts 12 and having a central opening for the passage of member 7. A sealing-ring retaining plate 14 is fastened to the outer surface of end wall 11 by screws 15 and is provided with an inwardly facing recess 16 in which a sealing ring 17 is arranged so that said ring is clamped between wall 11 and an opposing wall of said recess. The inner edge of ring 17 bears against member 7 and serves, in conjunction with the labyrinth sealing groove 18 in the defining wall of opening 13, to seal said opening.

At its opposite end housing 10 is provided with an integral end wall 20 provided with an inwardly facing recess 21 and an outwardly facing recess 22. A sealing ring retaining plate 23 is secured in recess 22 by screws 24 and serves to hold in place a sealing ring 25 which bears against the tubular member 7 which passes through a central opening of wall 20.

Member 7 is journalled in bearing housing 10 by two anti-friction bearings 27 and 28. These bearings are separated from each other by an interposed spacer sleeve 29 encircling member 7. Bearing 27 is arranged immediately adjacent the removable end wall 11 of housing 10 and bears against a shoulder 30 of member 7. Bearing 28 is arranged adjacent end wall 20 of housing 10 and is engaged by clamping nut 31 which is threaded on member 7 and is accommodated in recess 21. The complete bearing assembly, including bearings 27 and 28 and spacer sleeve 29, is clamped in place between the shoulder 30 of member 7 and clamping nut 31. The space between bearings 27 and 28 constitutes a lubricant reservoir 33 and is provided with a filling plug 34 and drain plug 34a.

Bearing housing 10 is provided with upper and lower arms 36 projecting beyond the end wall 20. These arms 36 are detachably secured, by bolts 37 and nuts 38, to the flange 39 of a hollow stationary casting 40. A partition 41 divides the interior of casting 40 into a steam chamber 42 and a condensate-receiving chamber 43. A portion of casting 40 extending from flange 39 to wall 42a of steam chamber 42 is shaped to provide a stuffing box 44 in which the free end of member 7 is rotatably fitted. Packing 45 is ar- 7. This packing is compressed between the closed end of the stuffing box and an adjustable gland nut 46 which is a sliding fit on member 7 and extends into the open end of the stuffing box. The gland nut 46 may be tightened against the packing 45 by any suitable gland nut adjusting means. In the present instance I have shown a pair of adjusting bolts 48, each passing through a stuffing box lug 49 and a gland nut lug 50 and having adjusting nuts 51 screwed onto its ends.

Steam supplied to steam chamber 42 is delivered to the interior of the steam heated cylinder through a steam delivery pipe 53 having its outer end screwed into a threaded opening 54 provided in steam chamber wall 42a. The pipe 53 extends inwardly through member 7 and journal 5 in spaced relation thereto.

Condensate is removed from the steam heated cylinder by a syphon pipe 56 extending into said cylinder through steam delivery pipe 53. A sleeve 57, welded onto the outer end of syphon pipe 56, is slidably fitted in a non-threaded opening 58 provided in the partition 41 separating steam chamber 42 from condensate receiving chamber 43. Nuts 59 and 60 are screwed onto the ends of sleeve 57 and are tightened against opposite sides of partition 41. The outer end of sleeve 57 projects beyond nut 60 and is provided with slots 62. These slots receive therein lugs 63 projecting inwardly from a syphon pipe adjusting plate 64 adjustably bolted in place over an opening 65 provided in the outer wall 66 of condensate-receiving chamber 43. Plate 64 is provided with arcuate slots 67 for the passage of studs 68 projecting from wall 66. Clamping nuts 69 are threaded onto the outer ends of studs 68 and serve to hold plate 64 in any position to which it is turned. When nuts 69 are loosened the slots 67 permit plate 64 to be turned to thereby rotate syphon pipe 56 to the correct angular position through the agency of lugs 63 engaging in slots 62.

An intermediate portion of syphon pipe 56 is adequately supported by the delivery end of steam delivery pipe 53. This is accomplished by providing the syphon pipe with lugs 71 (Figs. 3 and 4) having inner portions 72 fitted in the delivery end of steam pipe 53 in supporting engagement with the inner surface of said steam pipe. The outer portions of lugs 71 are wider than the inner portions 72 and are shaped to provide shoulders 73 which are drawn into clamping engagement with the inner end of steam pipe 53 by screwing the previously mentioned nut 60 into clamping engagement with portion 41. This method of supporting the syphon pipe from the casting 40 and steam pipe 53 of the steam joint assembly is an important feature of the invention. It eliminates the disadvantages characteristic of the conventional practice of mounting a syphon pipe supporting spider inside the steam cylinder at the inner end of journal 5. It also assures a more rigid mounting of the steam delivery pipe 53 by reason of the clamping pressure exerted against the delivery end of said pipe by the syphon pipe supporting lugs 71.

In the modified arrangement shown in Figs. 5 and 6 the wider outer portions of the lugs 71 are connected together by a centering ring 73a formed with a bevelled edge 73b adapted to engage a similar bevelled edge 73c provided at the delivery end of steam pipe 53. In both of the arrangements illustrated by Figs. 4 to 6 inclusive, the inner ends 71a of the inner portions of the lugs 71 are bevelled to facilitate their insertion in the delivery end of steam pipe 53.

The syphon-type steam joint assembly shown in Figs. 1 to 6 inclusive is convertible into a bucket-type assembly by removing casting 40 and syphon pipe 56 and substituting a bucket-type casting 75 to provide the revised assembly shown in Figs. 7 and 8. The casting 75 includes a stuffing box 76 and a gland nut 77 corresponding to the previously described stuffing box 44 and gland nut 56. It also includes a partition 78 which corresponds to the previously described partition 41 and divides the interior of casting 75 into a steam chamber 79 and a condensate receiving chamber 80. It will be noted, however, that the condensate receiving chamber 80 of casting 75 is located at the stuffing box side of partition 78 and that the steam chamber 79 is located at the opposite side of said partition. Casting 75 also includes a flange 81 which corresponds to the previously mentioned flange 39 and is bolted to the arms 36 of bearing housing 10.

In the bucket-type assembly shown in Fig. 7 the condensate is delivered to the journal 5 of the steam heated cylinder in the usual manner and flows outwardly through this journal and through tubular member 7 directly into the condensate receiving chamber 80 of casting 75. The steam delivery pipe 82 which corresponds to the previously mentioned steam delivery pipe 53 extends outwardly through the condensate receiving chamber 80 of casting 75 and has its outer end screwed into a threaded opening 83 provided in partition 78 and is thus placed in communication with the steam chamber 79.

From the foregoing it will be seen that I have provided a steam joint assembly which may be changed from a syphon-type to a bucket-type assembly and vice versa by interchangeable assembly of the castings 40 and 75 with the bearing housing 10 to which said castings are detachably secured. Another important feature of the invention characteristic of both the syphon-type and bucket-type assembly is that the delivery end of the tubular member 7 is sealed against leakage by a stationary stuffing box carried by the casting containing the steam chamber and the condensate receiving chamber.

A further important feature of the invention, as represented by the assembly shown in Figs. 1 to 6 inclusive, is the manner in which the syphon pipe is clamped against the delivery end of the steam delivery pipe and is rotatably adjusted to the correct angular position.

A still further advantage of the assembly shown in Fig. 1 is that the component parts of the steam joint assembly, including the steam supply pipe 53, may be detached from the journal 5 and removed to an out-of-the-way position without disturbing the syphon pipe 46. This is accomplished by removing the nuts 9a from the bolts 9 and unscrewing the nut 60 from the syphon pipe sleeve 57 after removing the syphon pipe adjusting plate 64. When the nuts 9a and 60 and the syphon pipe adjusting plates 64 are removed the component parts of the steam joint assembly, including the tubular member 7, the steam delivery pipe 53, the bearing housing 10 and the casting 40, may be drawn outwardly away from the journal 5 and over the syphon pipe 56. In this connection it will be noted that the steam delivery pipe 53 is large enough to slide freely over the nut 59 on the inner end of the sleeve which is welded to the syphon pipe.

Having thus described the nature of my invention it will be understood that various modifications may be resorted to within the scope and spirit of the invention as defined by the appended claims.

I claim:

1. A steam joint attachment for a rotary steam heated cylinder comprising a steam supply chamber and a condensate receiving chamber separated by an intervening partition wall having a syphon pipe opening therein in line with a larger steam supply opening provided in a side wall of the steam supply chamber, a steam supply pipe having one end supported in said steam supply opening and adapted to extend therefrom into an interior of the steam heated cylinder, a syphon pipe passing through said steam supply pipe and extending beyond opposite ends of said steam supply pipe, said syphon pipe having one end supported in said syphon pipe opening by adjusting means operable to effect longitudinal adjustment of the syphon pipe and supporting lugs carried by an intermediate portion of the syphon pipe and bearing against the delivery end and the adjacent inner surface of the steam pipe and adapted to be clamped against said delivery end of the steam supply pipe by longitudinal adjustment of the syphon pipe.

2. A steam joint attachment for a rotary steam heated cylinder comprising a casting affording a steam supply chamber and a condensate receiving chamber separated by an intervening partition wall having a syphon pipe opening therein in line with a larger steam pipe opening provided in a side wall of the steam supply chamber, a steam supply pipe having one end supported in said steam supply opening and extending from said opening into the interior of the steam heated cylinder, a syphon pipe passing through said steam supply pipe and having its ends extending between the corresponding ends of the steam pipe, one end of said syphon pipe extending through said syphon pipe opening, a sleeve slidably fitted in said syphon pipe opening and rigidly secured to the syphon pipe, means for effecting sliding adjustment of said sleeve and syphon pipe in the longitudinal direction thereof and syphon pipe supporting means carried by an intermediate portion of the syphon pipe and engaging the delivery end of the steam pipe, said syphon pipe supporting means being movable into and out of clamping engagement with the delivery end of the steam pipe by longitudinal adjustment of the syphon pipe.

3. A steam joint attachment for a rotary steam heated cylinder comprising a steam supply chamber and a condensate receiving chamber separated by an intervening partition wall having a syphon pipe opening therein in line with a larger steam supply opening provided in a side wall of the steam supply chamber, a steam pipe having one end supported in said steam supply opening and extending from said steam supply opening into the interior of the steam heated cylinder, a syphon pipe passing through said steam supply pipe and extending beyond the ends of the steam supply pipe, one end of said syphon pipe being slidably and rotatably mounted in said syphon pipe opening, syphon pipe supporting lugs carried by an intermediate portion of the syphon pipe and bearing against the inner surface of the steam pipe adjacent the delivery end of said steam pipe and a ring-shaped member carried by said lugs and bearing against the delivery end of the steam pipe, said ring-shaped member being shiftable into and out of clamping engagement with the delivery end of the steam pipe by longitudinal adjustment of the syphon pipe.

4. In a steam joint attachment for a rotary steam heated cylinder, a steam pipe, a syphon pipe passing through said steam pipe in spaced relation thereto and extending beyond the ends of the steam pipe, syphon pipe supporting means carried by an intermediate portion of the syphon pipe and engaging the delivery end and the adjacent inner surface of the steam pipe, a steam supply chamber to which the inlet end of the steam pipe is connected, a condensate receiving chamber to which the delivery end of the condensate pipe is connected by means mounting said syphon pipe for longitudinal adjustment.

RUSSELL CARPENTER.

REFERENCES CITED

The following references are of record in the file of this patent:

UNITED STATES PATENTS

| Number | Name | Date |
|---|---|---|
| 1,180,806 | Vedder | Apr. 25, 1916 |
| 1,665,614 | Valentine | Apr. 10, 1928 |
| 2,424,969 | Carpenter | Aug. 5, 1947 |